United States Patent
Bai et al.

[11] Patent Number: 5,568,353
[45] Date of Patent: Oct. 22, 1996

[54] ELECTROCHEMICAL CAPACITOR AND METHOD OF MAKING SAME

[75] Inventors: Lijun Bai, Vernon Hills; Joseph G. Kincs, Arlington Heights; Marc Chason, Schaumburg, all of Ill.

[73] Assignee: Motorola, Inc., Schaumburg, Ill.

[21] Appl. No.: 415,976

[22] Filed: Apr. 3, 1995

[51] Int. Cl.⁶ .................................................. H01G 9/00
[52] U.S. Cl. .......................... 361/523; 361/524; 361/528; 361/532; 361/502; 361/508; 361/516
[58] Field of Search .............................. 361/525, 523, 361/508, 512, 502, 516, 528, 532; 29/25.03; 429/94, 192, 101, 193, 218, 223, 246, 247, 144, 181

[56] References Cited

U.S. PATENT DOCUMENTS

| | | | |
|---|---|---|---|
| 5,001,023 | 3/1991 | Cheshire et al. | 429/94 |
| 5,030,527 | 7/1991 | Carpio et al. | 429/192 |
| 5,071,720 | 12/1991 | Notten | 429/101 |
| 5,142,406 | 8/1992 | Lampert et al. | 359/269 |
| 5,153,820 | 10/1992 | MacFarlane et al. | 361/525 |
| 5,388,026 | 2/1995 | Kanbara et al. | 361/525 |
| 5,419,977 | 5/1995 | Weiss et al. | 427/7 |

Primary Examiner—Leo P. Picard
Assistant Examiner—Anthony Dinkins
Attorney, Agent, or Firm—Kenneth M. Massaroni

[57] ABSTRACT

An electrochemical charge storage device (60) having two asymmetric inorganic electrodes (30, 36) is provided. The device may be fabricated using a bipolar plate which acts as both the conductor, and as the substrate upon which the active electrodes are formed. The bipolar plate may further be adapted to act as one of the active electrodes by activating a portion of the bipolar plate material.

24 Claims, 5 Drawing Sheets

SINGLE CELL = 0.085 MM

ELECTROCHEMICAL CAPACITOR AND METHOD OF MAKING SAME

TECHNICAL FIELD

This invention relates in general to the field of electrochemical devices, and more particularly to electrochemical capacitors and methods of fabricating same.

BACKGROUND

Electrochemical capacitors are a class of high-rate energy storage/discharge devices which use electrolytes and electrodes of various kinds. Electrochemical capacitors, like batteries, are essentially energy storage devices. However, unlike batteries, they rely on charge accumulation at the electrode/electrolyte interface to store energy. Charge storage in electrochemical capacitors therefore is a surface phenomenon. Conversely, charge storage in batteries is a bulk phenomenon occurring within the bulk of the electrode material. As a result of the differences in the charge/discharge mechanism between capacitors and batteries, the discharge profiles and discharge rates of the two devices are radically different.

Electrochemical capacitors can generally be divided into one of two subcategories. Double layer capacitors in which the interfacial capacitance at the electrode/electrolyte interface can be modeled as two parallel sheets of charge; and redox reaction based capacitor devices in which charge transfer between the electrolyte and the electrode occurs over a potential range, and is the result of primary, secondary, tertiary or higher oxidation/reduction reactions between the electrode and the electrolyte. These types of electrochemical capacitors are currently being developed for high pulse power applications.

Heretofore, electrochemical capacitor devices have suffered from problems associated with the manufacture and packaging of such devices. It is the nature of electrochemical capacitors to require relatively small packages which develop high pulse power spikes. Prior art methods of assembling such devices however substantially increased the thickness of the device, as well as the complexity of the manufacturing process. Increased complexity resulted in manufacturing defects which caused yield losses. Moreover as the package became thicker due to processing, the introduction of electrode equivalence series resistance (ESR) reduced the efficiencies of the devices fabricated.

Accordingly, there exists a need to provide a new process for manufacturing and assembling electrochemical capacitor devices. This process should emphasize ease and convenience of manufacturing while providing as thin a profile device as possible so as to reduce ESR and optimize gravimetric and volumetric energy and power densities. These devices should also be fabricated with electrolytes better tailored to the needs of electrochemical capacitors.

DETAILED DESCRIPTION OF THE PREFERRED EMBODIMENT

Figure 1:
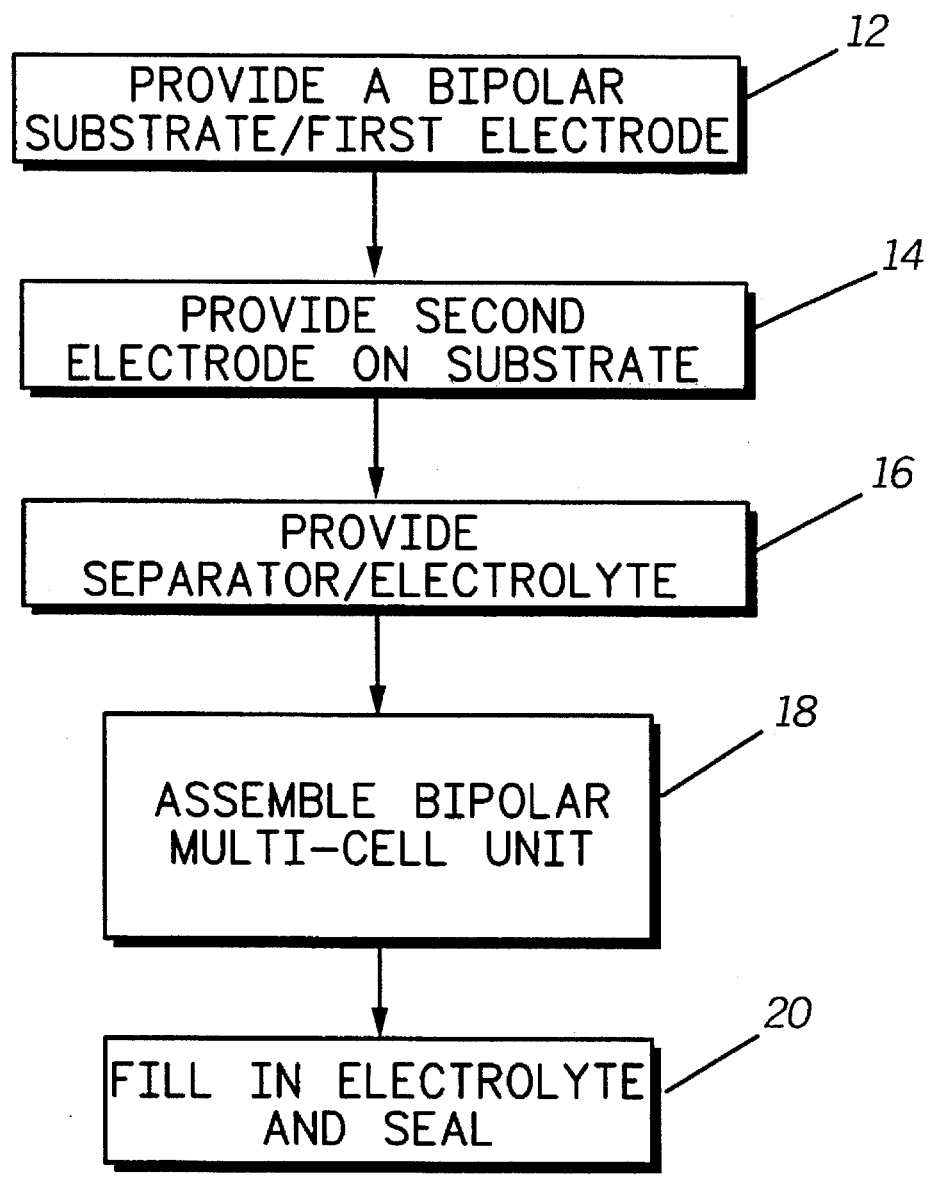
FIG. 1 is a flow chart illustrating the steps taken in assembling a bipolar electrochemical charge storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Figure 2:
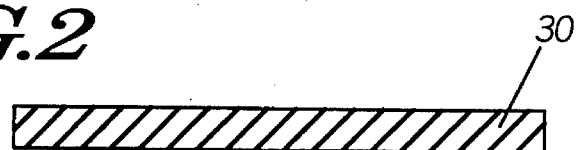
FIG. 2 is a cross-sectional side view of an electrochemical charge storage device during the first step in the assembly process thereof.

Referring now to FIG. 1, and FIGS. 2–6, there is illustrated therein a flow chart showing the steps for assembling a bipolar electrochemical charge storage device, and the individual steps in assembling the same. The flow chart 10 consists of five steps 12–20, each of said steps corresponding to one of FIGS. 2–6. Referring now to Step 12 of FIG. 1, and FIG. 2, there is illustrated the step of providing a bipolar substrate. The bipolar substrate is required to perform several functions: the substrate should act as either the anode or the cathode for the electrochemical charge storage device; it should function as the bipolar plate separating individual cells in a multi-cell configuration; and it should act as the substrate upon which the other electrode (anode or cathode) material is deposited. The bipolar substrate is illustrated in FIG. 2 as substrate 30. The substrate should be electrically conducting, and ionically insulating, and may be fabricated of any of a number of different materials which may be used in electrochemical charge storage devices such as redox electrochemical capacitors, examples of which include, cobalt, iron, tungsten, lead, nickel, silver, copper, alloys thereof, nickel-molybdenum-chromium alloys, and combinations thereof.

In one preferred embodiment, the substrate 30 is adapted to act as the cathode and the bipolar plate, and is fabricated of a nickel-molybdenum-chromium alloy such as that disclosed in commonly assigned copending U.S. patent application Ser. No. 08/322,130 filed Oct. 13, 1994 in the names of Ke Keryn Lian and Lijun Bai, the disclosure which is incorporated herein by reference. The substrate is preferably a thin foil having a thickness from approximately 15 to approximately 175 micrometers while the layer of electrode active material, such as the cathode, is between 0.001 and 1001 µm thick. According to industry convention, the cathode is defined as the positive electrode and the anode as the negative electrode during the discharge process. The roles are reversed during the charging process, thus, references herein to the cathode refer to the electrode serving as the cathode during discharge. Similarly references to the anode refers to the electrode serving as the anode during discharge.

Figure 3:
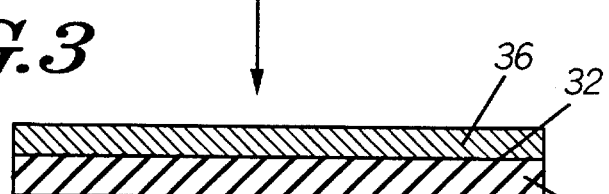
FIG. 3 is a cross-sectional side view of an electrochemical charge storage device during the second step in the assembly process thereof.

Referring to Box 14 of FIG. 1 and to FIG. 3 there is illustrated therein the step of providing a layer of the other or second electrode material 36, i.e., the anode material. The layer of anode material may be selected from any of a number of known materials which demonstrate appropriate behavior for an electrochemical charge storage device such as an electrochemical capacitor. Examples of preferred anode materials include antimony, bismuth, bismuth:antimony alloys, zinc, cadmium, lithium, lead, and combinations thereof. The anode material may be deposited in any of a number of known fashions including sputtering, electroplating, evaporation, melt coating, and thermal spray deposition. In one preferred embodiment, the anode is fabricated of a bismuth:antimony alloy such as that disclosed in commonly assigned copending U.S. patent application Ser. No. 08/358,294 filed Dec. 15, 1994 in the names of Li, et al, the disclosure of which is incorporated herein by reference. Further, such a layer may be deposited by thermal spray deposition onto a first major surface 32 of substrate 30. The substrate further includes a second major surface 34. The cathode active material described above is present on the second major surface to a thickness of between 0.0001 to 1001 µm. The layer of anode material 36 is deposited upon a first major surface 32 to a thickness of between 0.001 and approximately 100 micrometers.

Figure 4:
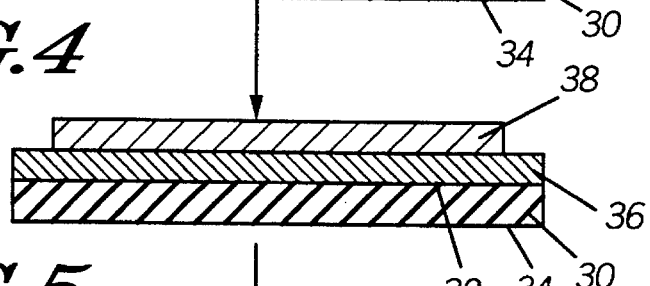
FIG. 4 is a cross sectional side view of an electrochemical charge storage device during the third step in the assembly process thereof.

Referring now to Box 16 of FIG. 1, and FIG. 4, there is illustrated therein the step of providing a layer of a separator material 38 disposed atop the layer of anode material 36. The separator should be a good ionic conductor and an electronic insulator. The separator material may be fabricated of a material such as, for example, a porous spinel $Al_2O_3$:MgO which may be applied directly to the layer of anode material. The porous spinel separator material may be fabricated by any of a number of known techniques including sputtering, electroplating, evaporation, melt space coating, thermal spray deposition, and combinations thereof. In one preferred embodiment, the layer of separator material is deposited by thermal spray deposition to a thickness of between 0.001 and 25 µm. The porous spinel $Al_2O_3$ separator is subsequently wetted with an aqueous electrolyte such as KOH, $H_2SO_4$, $H_3PO_4$. Alternatively, the separator may be fabricated of a polymer acid blend electrolyte or polymer alkaline gel electrolyte, examples of which include polyvinylalcohol (PVA)/$H_3PO_4$, polyethylene oxide (PEO)/$H_3PO_4$, polyvinyl propinol (PVP)/$H_2SOI_4$, PVA/KOH, poly(2-hydroxyethyl methacrylate (PHEMA)/KOH, poly acrylamide (PAM)/KOH and combinations thereof.

At this point, an individual single composite bipolar electrochemical charge storage device is completed. The device includes the substrate/cathode/bipolar plate 30 having an anode 32 deposited on one surface thereof and a layer of separator material disposed atop the layer of anode material. The thickness of a single cell is between about 0.050 and 0.20 mm, and typically about 0.085 mm. It is to be understood that the structure illustrated in FIG. 4 could be reversed. That is the substrate 30 could serve as the anode, with the cathode deposited on one surface of the substrate, with a layer of separator material disposed atop the layer of cathode material.

Figure 5:
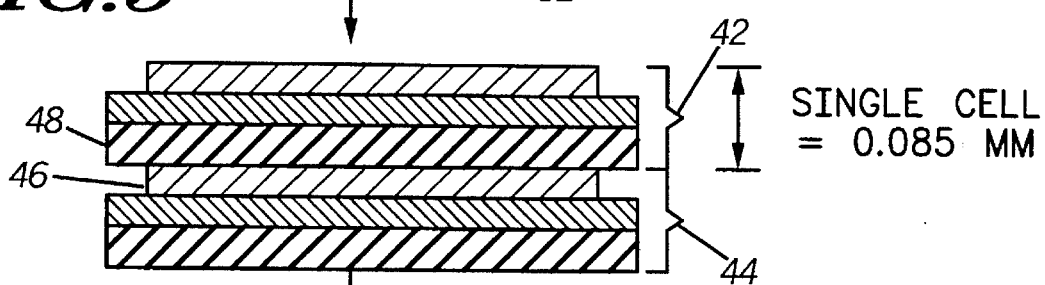
FIG. 5 is a cross sectional side view of an electrochemical charge storage device during the fourth step in the assembly process thereof.

Referring now to Box 18 of FIG. 1, and to FIG. 5, there is illustrated therein the step of assembling a bipolar multi-cell charge storage device. As illustrated in FIG. 5, the multi-cell unit comprises at least two individual charge storage devices 42 and 44, each assembled substantially as described hereinabove with respect to FIGS. 1–4. The two devices, 42 and 44, are arranged in a stacked configuration, such that the separator 46 of device 44 is disposed immediately adjacent to the substrate 48 of device 42. Prior to sealing the device completely with sealing materials known in the art such as teflon, a liquid electrolyte would be injected into the package if the separator 46 is of the porous $Al_2O_3$ type. The electrolyte may be selected from any of in number of materials known in the electrochemical art, and in one preferred embodiment would be a 31% KOH solution.

Figure 6:
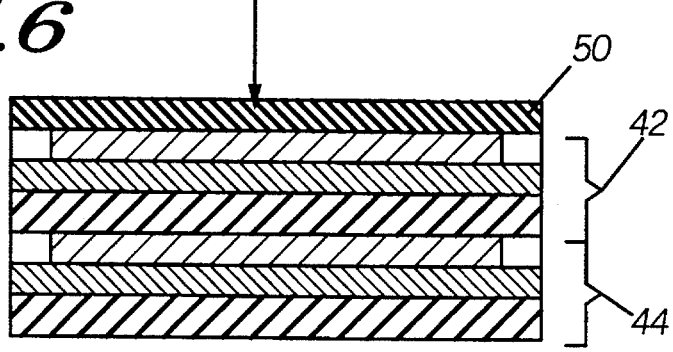
FIG. 6 is a cross-sectional side view of an electrochemical charge storage device during the fifth step in the assembly process thereof.

Referring now to Box 20 of FIG. 1, and to FIG. 6, there is illustrated therein the final step in assembling a bipolar multi-cell unit as illustrated in FIG. 5. Specifically, Box 20 of FIG. 1, and FIG. 6 illustrate the step of filling the multi-cell unit with an electrolyte as described hereinabove with respect to FIG. 4, and adding an end plate 50 atop uppermost individual cell 42. The end plate is typically fabricated of material such as that described hereinabove with respect to substrate 30 of FIG. 2. Thereafter, the multi-cell unit is encapsulated in a sealing material as is known in the art, and if necessary, filled with an electrolyte, also as described hereinabove with respect to FIG. 4. It is to be understood that upon injecting the electrolyte into the multi-cell unit, the second major surface 34 of substrate 30 is slightly oxidized forming a thin layer of an electrochemically active material on the second surface of substrate 30, comprised of an oxide of material from which the substrate is formed. This oxide material layer forms on the second major surface 34 of the substrate 30; that is the side of the substrate opposite the anode layer.

An additional advantage of the individual unit cells in FIG. 1–4, is the fact that a single component, the substrate 30, replaces three functional parts: the cathode, the bipolar plate, and the current collector, all of which are components of existing bipolar electrochemical charge storage devices. By use of a single component, the thickness of each cell is significantly reduced. Therefore, the power and energy densities are increased for electrochemical charge storage devices built in accordance with the invention. Further, since the anode materials are coated onto the substrate by, for example, sputtering or thermal spray, the difficulties with making thin flexible anodes such as bismuth or bismuth:antimony foils is avoided. Further, the electrical contact between the anode and the bipolar plate is greatly improved, hence improving device performance.

Figure 7:
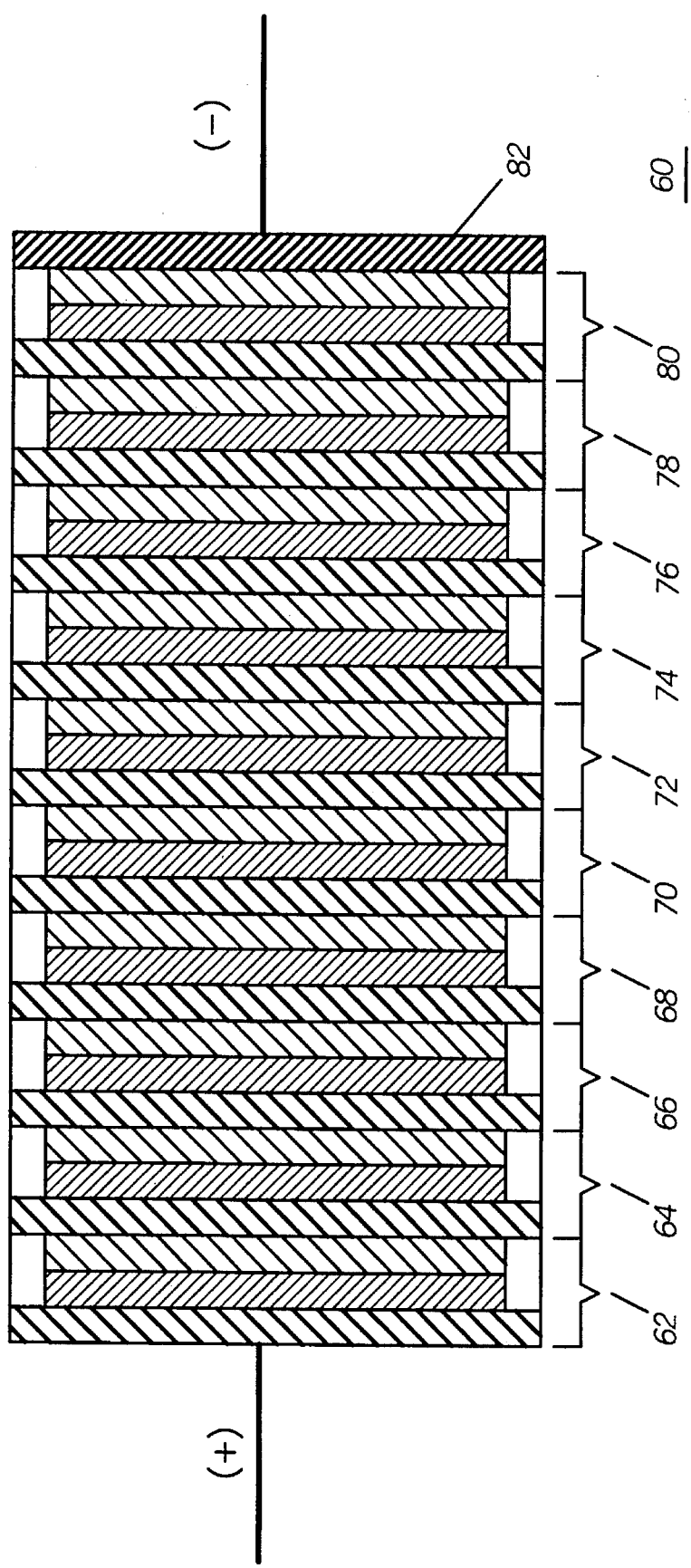
FIG. 7 is a cross-section side view of a multi-cell bipolar electrochemical charge storage device in accordance with the instant invention.

Referring now to FIG. 7, there is illustrated therein an electrochemical charge storage device 60 comprised of 10 individual devices as illustrated hereinabove with respect to FIG. 4. The ten units, 62, 64, 66, 68, 70, 72, 74, 76, 78, and 80 are arranged in stacked configuration and sealed as described hereinabove with respect to FIG. 1, Box 20 and FIG. 6. Disposed atop uppermost individual cell 80 is a top bipolar plate 82, such as that described hereinabove with respect to plate 50 in FIG. 6. The cell voltage and thickness of the device illustrated in FIG. 7 would be approximately 10–12 volts and have a thickness of to approximately 0.85 millimeters.

EXAMPLE

Example I

In order to prove operation of the device described hereinabove, a nickel-molybdenum-chromium alloy bipolar substrate was fabricated with a bismuth anode disposed on one side thereof and a wick paper separator saturated with 30% KOH. A bipolar electrochemical charge storage device such as that described hereinabove with respect to FIG. 6 was assembled. A teflon film was used as a sealing material. The electrode surface area was 2 cm². The device was sealed in a starved electrolyte configuration. The cell was activated after assembly, i.e., the substrate material was exposed to the electrolyte forming the oxide on the surface opposite the surface upon which the bismuth anode material was disposed. The open circuit voltage of such a device was approximately 1.8 volts.

Example II

Figure 8:
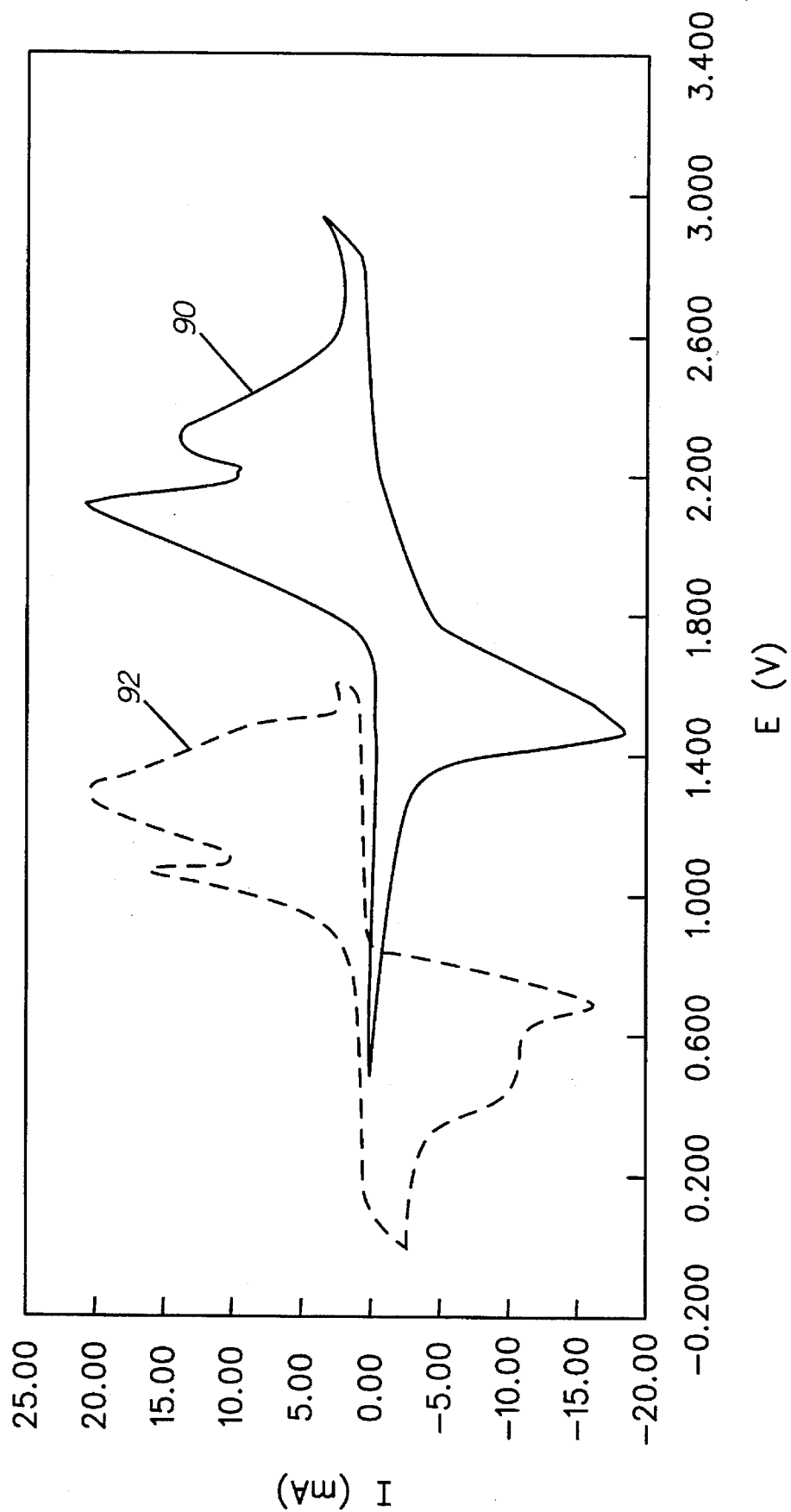
FIG. 8 is a cyclic voltammagram taken at 100 mV/s for an electrochemical capacitor device in accordance with the instant invention.
Figure 9:
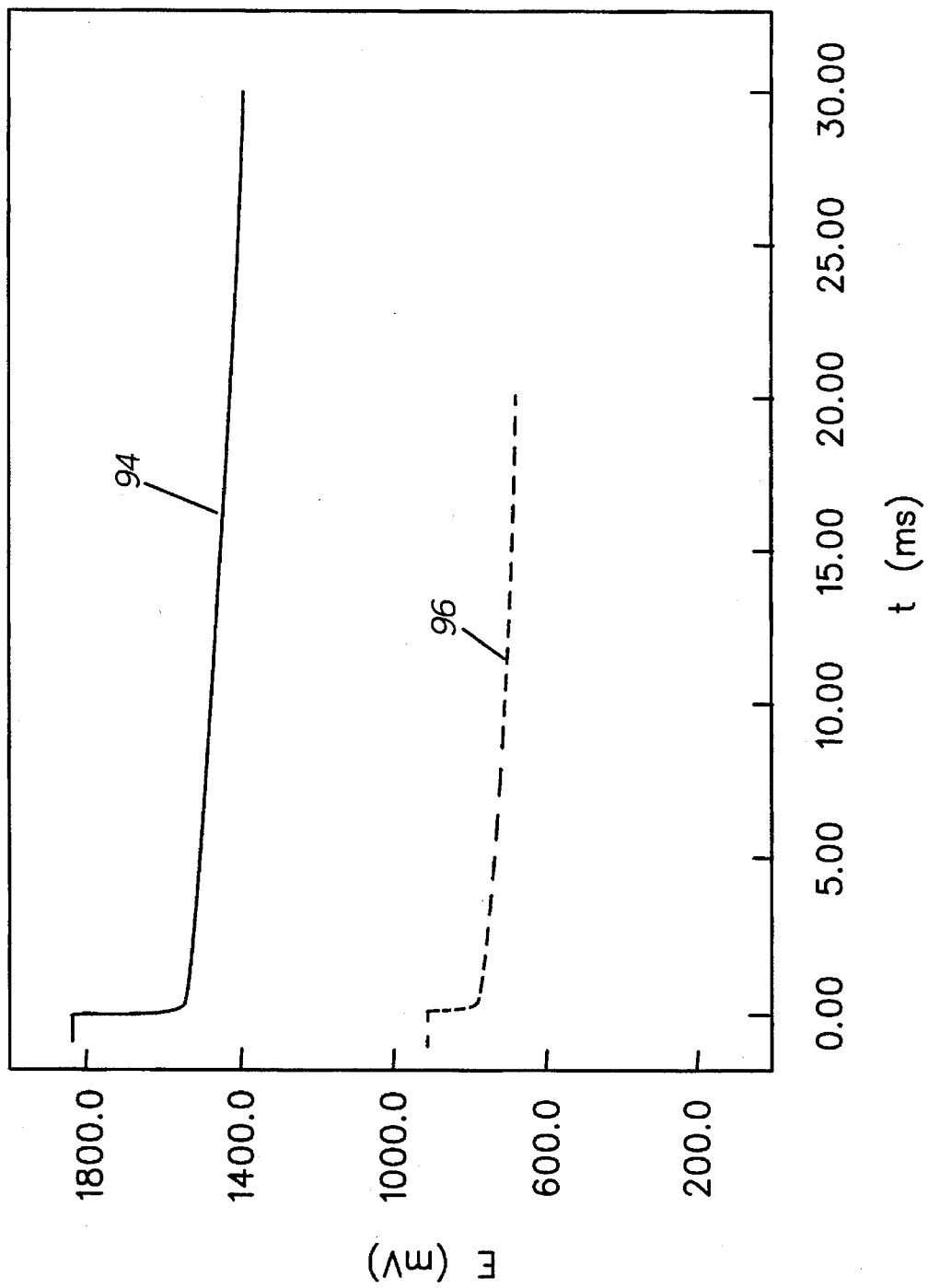
FIG. 9 is a graph illustrating constant current discharge curves for electrochemical capacitor devices in accordance with the instant invention.

Referring now to FIG. 8, there is illustrated therein cyclic voltammagram profiles taken at 100 mV/s for an electrochemical capacitor charge storage device in accordance with the instant invention. Specifically, line 90 illustrates the performance of an electrochemical capacitor having a cathode fabricated of the nickel/molybdenum/chromium alloy/ bismuth anode two-stacked cell bipolar device described above. Similarly, line 92 illustrates the performance for a single cell device. It may be appreciated from a perusal of FIG. 8 that the peak potential of the two stacked cell device is approximately twice that of the corresponding single cell device. Device performance was otherwise similar and demonstrated good cycle life, e.g., approximately 3000 cycles with no deterioration in observed performance Referring now to FIG. 9, there is illustrated therein constant current discharge curves taken at a 50 mA/cm² discharge current for the two stacked cell bipolar device at line 94, and a single stack cell device illustrated by line 96. From FIG. 9, it may be appreciated that the two stacked cell device had a working voltage of approximately twice that of the single stacked cell device.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical capacitor device, comprising:
  a suibstrate having at least a first and a second major surface, said substrate being fabricated of a material which is electrically conducting and ionically insulating, the second major surface thereof providing a layer of electrochemically active cathode material;
  a layer of electrochemically active anode material disposed on said first major surface;
  a layer of a separator material which is ionically conducting and electrically insulating disposed on at least one of the anode layer or cathode layer.

2. An electrochemical capacitor device as in claim 1, wherein said substrate is formed of a material selected from the group consisting of nickel, nickel alloys, nickel-molybdenum-chromium alloys, cobalt, cobalt alloys, lead, lead alloys, iron, iron alloys, tungsten, tungsten alloys, silver, silver alloys and combinations thereof.

3. An electrochemical capacitor device as in claim 1, wherein said substrate is formed of a nickel-molybdenum-chromium alloy.

4. An electrochemical capacitor device as in claim 1, wherein said layer of electrochemically active cathode material comprises a layer of oxidized substrate material.

5. An electrochemical capacitor device as in claim 1, wherein the layer of electrochemically active cathode material is between 0.001 and 100 μm thick.

6. An electrochemical capacitor device as in claim 1, wherein said layer of electrochemically active anode material is fabricated of a material selected from the group consisting of bismuth, bismuth alloys, antimony, antimony alloys, bismuth:antimony alloys, zinc, cadmium, lithium, lead, and combinations thereof.

7. An electrochemical capacitor device as in claim 1, further comprising a plurality of devices arranged in a stacked relationship.

8. An electrochemical capacitor device as in claim 1, wherein said separator is a deposited layer of Al₂O₃ based material.

9. An electrochemical capacitor device as in claim 1, wherein said separator is a polymer impregnated with an electrolyte.

10. An electrochemical charge storage device, comprising:
  a substrate having at least a first and a second major surface, said substrate being fabricated of a material which is electrically conducting and ionically insulating;
  a layer of electrochemically active first electrode material disposed on said first major surface of said substrate, said first electrode material comprising a layer of oxidized substrate material;
  a layer of electrochemically active second electrode material disposed on said second major surface; and
  a layer of a separator material which is ionically conductive and electrically insulating disposed on at least one electrode layer.

11. An electrochemical capacitor device as in claim 10, wherein said substrate is formed of a material selected from the group consisting of nickel, nickel alloys, nickel-molybdenum-chromium alloys, cobalt, cobalt alloys, lead, lead alloys, iron, iron alloys, tungsten, tungsten alloys, silver, silver alloys and combinations thereof.

12. An electrochemical capacitor device as in claim 10, wherein said substrate is formed of a nickel-molybdenum-chromium alloy.

13. An electrochemical capacitor device as in claim 10, wherein the layer of electrochemically active first electrode material is between 0.001 and 100 μm thick.

14. An electrochemical capacitor device as in claim 10, wherein said layer of electrochemically active second electrode material is fabricated of a material selected from the group consisting of bismuth, bismuth alloys, antimony, antimony alloys, bismuth:antimony alloys, zinc, cadmium, lithium, lead, and combinations thereof.

15. An electrochemical capacitor device as in claim 10, further comprising a plurality of devices arranged in a stacked relationship.

16. An electrochemical capacitor device as in claim 15, further including a separator disposed between each stacked device.

17. An electrochemical capacitor device as in claim 16, wherein said separator is a deposited layer of Al₂O₃.

18. An electrochemical capacitor device as in claim 10, wherein said separator is a polymer impregnated with an electrolyte.

19. An electrochemical charge storage device comprising a plurality of stacked charge storage sub-assemblies, each said sub-assembly comprising:
  a substrate having at least a first and a second major surface, said substrate being fabricated of a nickel-molybdenum-chromium alloy and providing a layer of electrochemically active cathode material disposed on said first major surface of said substrate, said cathode material being fabricated of oxidized substrate material; and a layer of electrochemically active anode material disposed on said second major surface.

20. An electrochemical capacitor device as in claim 19, wherein the layer of electrochemically active cathode material is between 10 and 100 μm thick.

21. An electrochemical capacitor device as in claim 19, wherein said layer of electrochemically active anode material is fabricated of a material selected from the group consisting of bismuth, bismuth alloys, antimony, antimony alloys, bismuth:antimony alloys, zinc, cadmium, lithium, lead, and combinations thereof.

22. An electrochemical capacitor device as in claim 19 further including a separator layer disposed between each stacked sub-assembly.

23. An electrochemical capacitor device as in claim 22, wherein said separator is a deposited layer of $Al_2O_3$.

24. An electrochemical capacitor device as in claim 22, wherein said separator is a polymer impregnated with an electrolyte.

* * * * *